United States Patent [19]

Maruyama et al.

[11] Patent Number: 4,846,576
[45] Date of Patent: Jul. 11, 1989

[54] METHOD FOR MEASURING A THREE-DIMENSIONAL POSITION OF AN OBJECT

[75] Inventors: Tsugito Maruyama, Machida; Shinji Kanda, Yokohama; Keishi Hanahara, Yamato, all of Japan

[73] Assignee: Fujitsu Limited, Kawasaki, Japan

[21] Appl. No.: 864,846

[22] Filed: May 20, 1986

[30] Foreign Application Priority Data

May 20, 1985 [JP] Japan .................. 60-107675
Dec. 18, 1985 [JP] Japan .................. 60-284767
Dec. 18, 1985 [JP] Japan .................. 60-284768

[51] Int. Cl.$^4$ .............................................. G01B 9/02
[52] U.S. Cl. ............................................. 356/376; 356/1
[58] Field of Search ................ 356/354, 355, 356, 375, 356/376, 1, 162.17, 169, 433; 396/376, 1, 375, 376

[56] References Cited

U.S. PATENT DOCUMENTS

| | | | |
|---|---|---|---|
| 4,212,073 | 7/1980 | Balasubramanian | 356/376 |
| 4,335,962 | 6/1982 | Di Matteo et al. | 356/376 |
| 4,357,108 | 11/1982 | Stern et al. | 356/376 |
| 4,412,121 | 10/1983 | Kremers et al. | 356/376 |
| 4,423,931 | 1/1984 | Shapiro | 356/376 |
| 4,452,534 | 6/1984 | Gribanov et al. | 356/376 |
| 4,498,778 | 2/1985 | White | 356/376 |

FOREIGN PATENT DOCUMENTS

| | | |
|---|---|---|
| 0107820 | 5/1984 | European Pat. Off. . |
| 2517052 | 5/1983 | France . |
| 59-108907 | 6/1984 | Japan . |
| 60-49475 | 3/1985 | Japan . |
| 60-126775 | 7/1985 | Japan . |
| 604128 | 8/1978 | Switzerland . |

OTHER PUBLICATIONS

Proc. 6th Int. Conf. Pattern Recog., vol. 1, pp. 220–222, 1982.
"Wiresight: Robot Vision for Determining Three-Dimensional Geometry of Flexible Wires", The Proceedings of 1983 International Conference on Advanced Robotics (ICAR), Sep. 12–13, 1983, Tokyo, Japan, pp. 133–138.

Primary Examiner—Richard A. Rosenberger
Attorney, Agent, or Firm—Staas & Halsey

[57] ABSTRACT

A method for measuring a three-dimensional position of an object with a single camera and a multislit light, i.e., a source of multiplanar light beams. A surface of the object is irradiated with multislit lights, i.e., multiplanar light beams, having a plurality of slit light faces and also irradiated with a single standard slit light having a slit light face identical to one of the plurality of slit light faces of the multislit lights. A plurality of slit light photo images corresponding to a plurality of slit light projected images and a standard slit light photo image corresponding to a slit light projected image formed on the object are obtained. One of the slit light photo images which corresponds to the standard slit light photo image is specified and made to correspond, to compute a three-dimensional position of the object in a predetermined coordinate.

21 Claims, 21 Drawing Sheets

SLIT LIGHT PHOTO IMAGE ON OBJECT

SLIT LIGHT PHOTO IMAGE

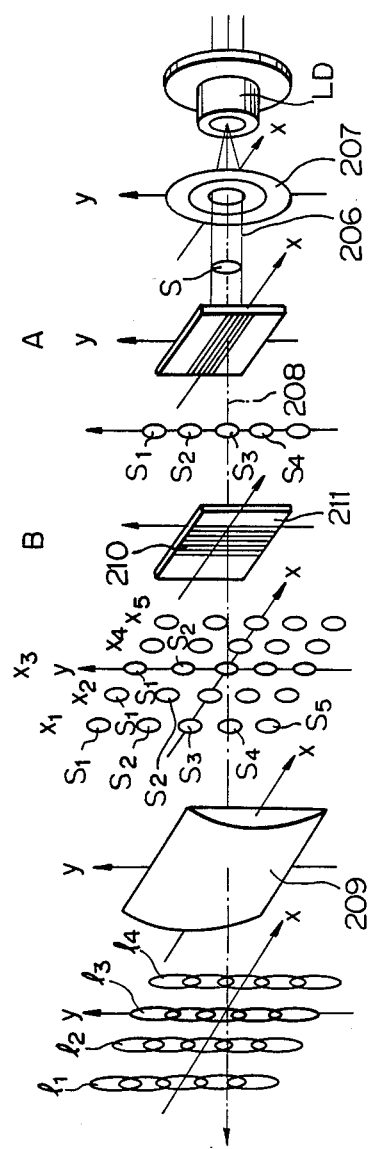
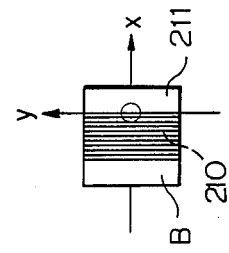
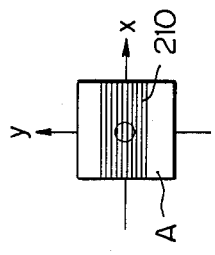
Fig. 13A
Fig. 13B
Fig. 13C

METHOD FOR MEASURING A THREE-DIMENSIONAL POSITION OF AN OBJECT

BACKGROUND OF THE INVENTION

1. Field of the Invention

This invention relates to a method for measuring a three-dimensional position of an object which can be used in controlling an industrial robot. More particularly, it relates to a method for measuring a three-dimensional position of an object by irradiating multislit lights, i.e., multiplanar light beams, onto the object to obtain the images thereof.

2. Description of the Related Art

A conventional system for measuring a three-dimensional position of an object comprises two cameras near to the object and a multislit light source, i.e., a source of multi-planar light beams, for irradiating light onto the object. A plurality of slit light, i.e., multiplanar light beam, projected images formed on the object are photographed by the two cameras, and a plurality of slit light photo images on the respective two cameras corresponding to the above-mentioned slit light projected images, respectively, are determined. Accordingly, a three-dimensional position of the object can be measured on the bases of these images on the two cameras through the principle of triangulation.

In the system according to the related art as mentioned above, it is difficult to obtain correspondence between the plurality of slit light photo images, i.e., the multiplanar light beam images, received by the first camera, and those received by the second camera, and the implementation of such a process requires an undesirable amount of time.

SUMMARY OF THE INVENTION

An object of the present invention is to provide a method for measuring a three-dimensional position of an object, capable of making such a measurement with a single camera, and accordingly, eliminating a process hitherto necessary for obtaining correspondence between the plurality of slit light photo images received by the two cameras of the related art.

Another object of the present invention is to provide a simplified method for measuring a three-dimensional position of an object and lightweight apparatus implementing that method.

To better understand the description of the invention as set forth herein, the terminology is first defined and exemplified with reference to FIG. 1 (described in detail hereafter):

(1) "slit light" means a planar light beam, as shown at 8 and produced by slit light source 6 in FIG. 1;

(2) "multislit lights" mean a multiplanar light beam or, synonymously, a plurality of planar light beans, as shown at 3 and produced by multislit light source 5 in FIG. 1;

(3) "face" means a plane;

(4) "slit light face" means the plane in which a slit light exists, i.e., along which the slit light passes; correspondingly, "a plurality of slit light faces" means the plurality of planes on which the multislit lights, i.e., the multiplanar light beams (or, synonymously, the plural planar light beams) exist, as shown at 5 in FIG. 1.

Each of the slit light beam and the multislit light beam is "illuminated," or "projected" onto an object and forms, for the former, a single corresponding luminance line 7 and for the latter, plural respective luminance lines 7 on the object, and corresponding (projected) "images" of the object on its surface; the latter then provide, respectively, single and plural "photo images" as received by a camera.

According to the present invention, there is provided a method for measuring a three-dimensional position of an object, comprising the following steps of: irradiating a surface of the object with multislit lights having a plurality of slit light faces fixedly arranged in a predetermined coordinate; irradiating the surface of the object with a single standard slit light having a slit light face identical to one of the plurality of slit light faces of the multislit lights; obtaining a plurality of slit light photo images corresponding to a plurality of slit light projected images formed on the surface of the object by the multislit light; obtaining a standard slit light photo image corresponding to a slit light projected image formed on the surface of the object by the single standard slit light; specifying one of the plurality of slit light photo images which corresponds to the standard slit light photo image; obtaining a correspondence between the respective slit light photo images and the respective slit light faces of the multi slit lights on the basis of the relative positions of the specified slit light photo image and the other slit light photo images, presuming that there are no interchanges between the plurality of slit light photo images; and, computing a three-dimensional position of the object in the predetermined coordinate on the basis of the relative positions of the respective slit light photo images and slight light faces already made to correspond with the respective slit light photo images. This invention makes it possible to measure a three-dimensional position of the object with a single camera.

BRIEF DESCRIPTION OF THE DRAWINGS

FIG. 13A is an exploded perspective view illustrating a device for emitting multislit lights in the second embodiment;

FIGS. 13B and 13C are plan views of diffraction gratings A and B, respectively, used in the device shown in FIG. 13A;

DESCRIPTION OF THE PREFERRED EMBODIMENTS

Principle of Measurement

Figure 1:
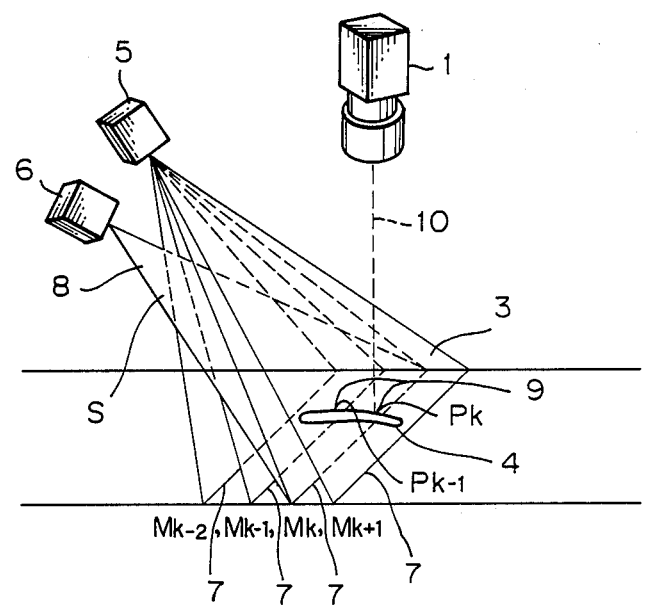
FIGS. 1 and 2 are schematic views illustrating a principle of three-dimensional measurement in a first embodiment of this invention.
Figure 2A:
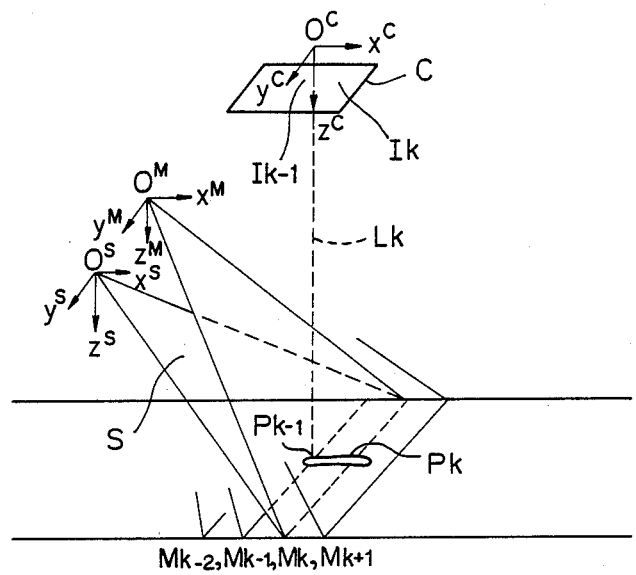
Figure 2B:
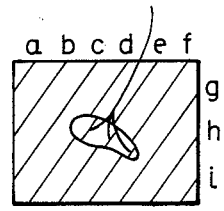

Referring now to FIGS. 1, 2A and 2B, it is assumed that a predetermined orthogonal coordinate of a camera, $O^C\text{-}X^CY^CZ^C$, has a starting point at the focus of a video camera 1 and a Z-axis along an optical axis of the camera 1. It is also assumed that an orthogonal coordinate of a multislit light beam, $O^M\text{-}X^MY^MZ^M$, has a starting point at a multislit light source 5. This coordinate of the multislit light beam is parallelly moved along $Y^M$. orthogonal coordinate of a standard single slit, $O^S\text{-}X^SY^SZ^S$, having a starting point at a standard single slit light beam light source 6, is presumed. The relationship between the camera orthogonal coordinate and the multislit orthotomic coordinate is generally given as follows.

$$\begin{pmatrix} x^M \\ y^M \\ z^M \\ 1 \end{pmatrix} = \begin{pmatrix} h_{11} & h_{12} & h_{13} & h_{14} \\ h_{21} & h_{22} & h_{23} & h_{24} \\ h_{31} & h_{32} & h_{33} & h_{34} \\ h_{41} & h_{42} & h_{43} & h_{44} \end{pmatrix} \begin{pmatrix} x^C \\ y^C \\ z^C \\ 1 \end{pmatrix} \quad (1)$$

However, $h_{ij}$ (i, j=1, 2, 3) represents a cosine of the angle between the coordinate axes $O^c\text{-}X^CY^CZ^C$ and $O^M\text{-}X^MY^MZ^M$, and $h_{i4}$ (i=1, 2, 3) represents a parallelly moved distance.

It is now assumed that each slit optical face M (i.e., $M_k-2, \ldots M_k+1$ as designated in FIG. 1); of the multislit light 3 is obtained by rotating the plane, $X^M=0$, represented by the multislit orthogonal coordinate, by a predetermined angle, about the axis of $Y^M$. A slit optical face $M_j$, which is obtained by rotating the plane, $X^M=0$, by an angle of $\theta j$ (j=1 to m) about the axis of $Y^M$, is given as follows.

$$x^M \cos\theta_j - z^M \sin\theta_j = 0 \quad (2)$$

This is represented by using the camera orthogonal coordinate as follows. Using the representation (1), $$M_j: (h_{11} x^C + h_{12} y^C + h_{13} z^C + h_{14})\cos\theta_j - \quad (3)$$

$$(h_{31} x^C + h_{32} y^C + h_{33} z^C + h_{34})\sin\theta_j =$$

$$0 \, (j = 1 \text{ to } m)$$

On the other hand, it is assumed that a slit optical face S of the standard slit light 8 is obtained by rotating the plane, $X^S=0$, represented by the standard slit orthogonal coordinate, by a predetermined angle $\theta_S$, about the axis of $Y^S$ (which coincides with $Y^M$). $\theta_S$ is adjusted to conform to the number K slit optical face $M_K$ of the multislit light 3 as follows.

$$\theta_s = \theta_k \quad (4)$$

Here, a standard slit optical face S of the standard slit light 8 may be represented as follows.

$$x^s \cos\theta_s - z^s \sin\theta_s = 0 \quad (5)$$

This is represented by using the cameras orthogonal coordinate as follows. Using the representation (1), $$S: (h_{11} x^C + h_{12} y^C + h_{13} z^C + h_{14})\cos\theta_s - \quad (6)$$

$$(h_{31} x^C + h_{32} y^C + h_{33} z^C + h_{34})\sin\theta_s = 0$$

Now, it is assumed that by irradiating m multislit light(s) 3, a plurality of luminance lines 7 and corresponding slit light projection images 9 are created on the surface of the object 4, and by taking these images by the camera 1, l slit light photo images corresponding to the slit light projection images 9 are obtained on an image face, such as a photo element, in the camera 1. Here, for the simplicity, it is presumed that the object 4 is linear, like a wire the coordinate of the slit light projected image on the object 4 is Pi ($X^c_{pi}$, $Y^c_{pi}$, $Z^c_{pi}$), (i=1 to l), and the coordinate of the slit light photo image corresponding to the respective slit light projected image 9 is Ii ($X^C_{Ii}$, $Y^C_{Ii}$, $Z^C_{Ii}$), (i=1 to l). Here, for convenience, it is also presumed that the image plane C is the plane $Z^C=f$ (a constant focal distance) parallel to the plane $X^CY^C$. In this case, if the line of sight 10 is presumed to be a line L ($=O^C I_i$), L is given as follows.

$$L_i: \frac{x^C}{x^C_{Ii}} = \frac{y^C}{y^C_{Ii}} = \frac{z^C}{f} \quad (7)$$

The three dimensional coordinate, Pi, of one of the spot-like slight light projected images 9 is determined as the intersection of the line of sight 10, i.e., the straight line Li, and a slit light face Mi corresponding to Pi.

However, in this stage, the correspondence of each slight light photo image Ii (i=1 to l) to a slit light face Mj of the single slit light 3 which are unknown; specifically, it has not been determined that $I_1$-$I_l$ corresponds to which slit light face among $M_1$ to M is irradiating onto the object 4.

According to the present invention, a standard slit light 8 having the same slit optical face S as a slit optical face $M_K$ formed by one of the multislit lights 3 is irradiated in time sequence with multislit light(s) 3 and correspondingly produces a single luminance line 7 (i.e., as associated with the face, or plane, of the slit light 8) Here, the coordinate of a slit light projected image 9 on the object 4 by the standard slit light 8 is presumed to be $P_S(X^CPS, Y^CPS, Z^CPS)$, and the coordinate of the standard slit light photo image corresponding to the slit light projected image 9 is presumed to be Is $(X^CIS, Y^CIS, Z^CIS)$, $Z^CIS=f$. In this case, the line of sight $L_S$ ($=O_C$ Is) is represented as follows.

$$L_S: \frac{x^C}{x^C_{Is}} = \frac{y^C}{y^C_{Is}} = \frac{z^C}{f} \tag{8}$$

$P_S$ (a spot of slit light projected image 9) can be determined as the intersection of the line $L_S$ and the slit optical face S corresponding to $P_S$. Therefore, from the representation (8), $$x^C = \frac{x^C_{Is}}{f} z^C, \quad y^C = \frac{y^C_{Is}}{f} z^C \tag{9}$$

is obtained. If this is inserted into the representation (6), $Z^C$ is given as follows.

$$\left\{ \left( h_{11}\frac{x^C_{Is}}{f} + h_{12}\frac{y^C_{Is}}{f} + h_{13} \right)\cos\theta_s - \left( h_{31}\frac{x^C_{Is}}{f} + h_{32}\frac{y^C_{Is}}{f} + h_{33} \right)\sin\theta_s \right\} z^C = \tag{10}$$

$$h_{14}\cos\theta_s + h_{34}\sin\theta_s$$

Therefore, $$z^C = (h_{14}\cos\theta_s + h_{34}\sin\theta_s)/g \tag{11a}$$

If this is inserted into the representation (9), $$x^C = (h_{14}\cos\theta_s + h_{34}\sin\theta_s) x^C_{Is}/fg \tag{11b}$$
$$y^C = (h_{14}\cos\theta_s + h_{34}\sin\theta_s) y^C_{Is}/fg \tag{11c}$$

are obtained.
Here, $$g = \left( h_{11}\frac{x^C_{Is}}{f} + h_{12}\frac{y^C_{Is}}{f} + h_{13} \right)\cos\theta_s - \left( h_{31}\frac{x^C_{Is}}{f} + h_{32}\frac{y^C_{Is}}{f} + h_{33} \right)\sin\theta_s \tag{12}$$

The above equations 11a through 11c, hereinafter referred to simply as (11), and the above equations afford (12) a representation of Ps as referenced to the camera orthogonal coordinate.

Since the slit light face S formed by the standard slit light 8 corresponds to one face Mk (i.e. $M_{k-2}$ ... $M_{k+1}$) of the slit light faces M of the multislit lights 3, one which corresponds to the standard slit light photo image Is necessarily can be found in the slit light photo images Ii (i=1 to l) of the multislit lights 3. Thus, if a slit light photo image specified by Is is presumed to be Ir, the latter is made to correspond to the slit light face S formed by the standard slit light 8 and, therefore, to the specific, corresponding slit face Mk of the multislit light(s) 3. Then, in view of the arrangements of the multislit lights 3 and the slit light photo images, presuming no interchange between the two factors, $I_{r-1}$ is made to correspond to $M_{k-1}$, $I_{r-2}$ to $M_{k-2}$, ... $I_1$ to $M_{k-r+}$, $I_{r+1}$ to $M_{k+1}$, $I_{r+2}$ to $M_{k+2}$, ..., and $I_l$ to $M_{k+l-r}$, respectively.

Therefore, in these relationships, in the representations (11) and (12), in place of $(x^C_{Is}, Y^C_{Is}, \theta_s)$, by inserting $(X^c_{I1}, Y^c_{I1}, O_{k-r+1})$ in $P_1$, $(X^C_{I2}, Y^C_{I2}, O_{k-r+2})$, in $P_2$ ... $(x^C_{Il}, Y^C_{Il}, O_{k+l-r})$ in $P_l$, a three dimensional position in the camera orthogonal coordinate of the slit light projected image 9 of the object 4 can be determined and, therefore, a three dimensional position of the object 3 can be determined.

MEASURING SYSTEM

Figure 3:
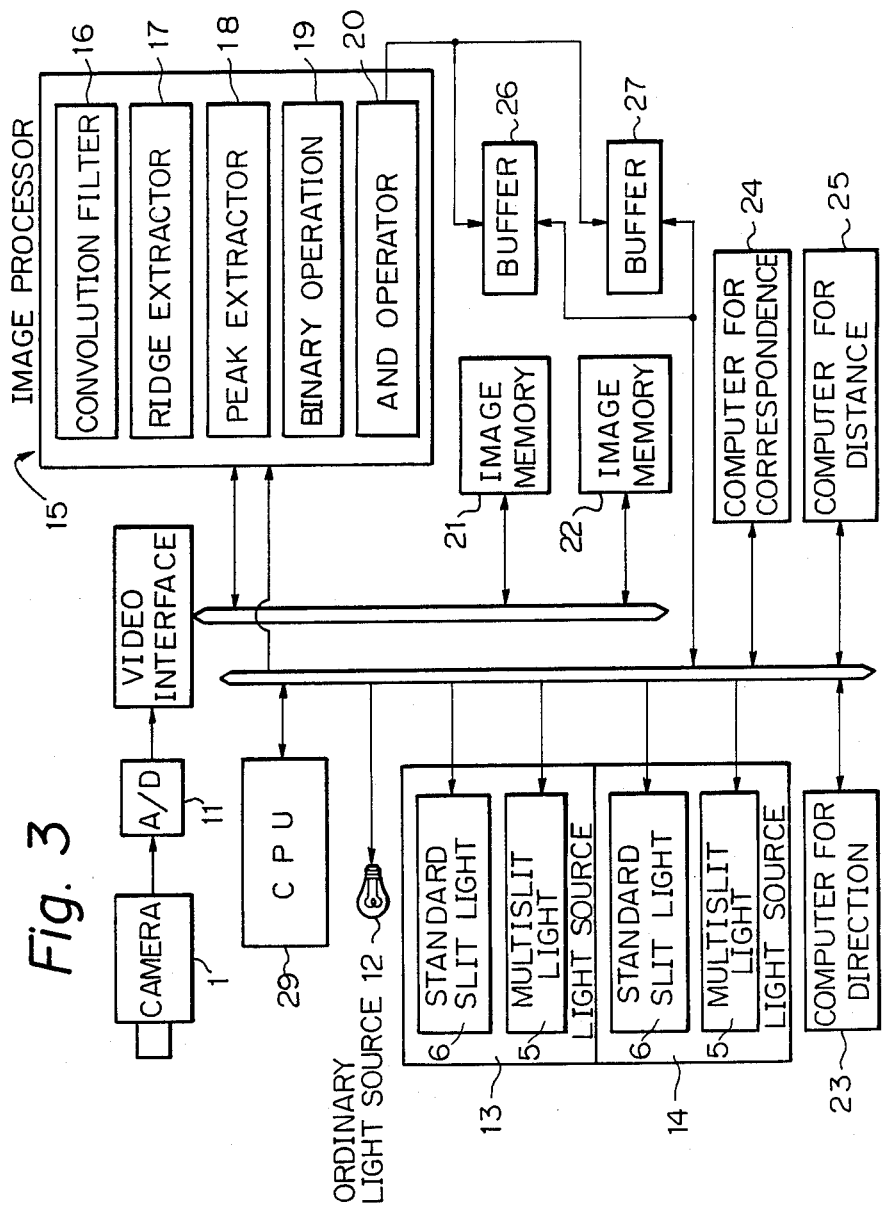
FIG. 3 is a block diagram illustrating an apparatus for measuring a three-dimensional position in the first embodiment.

A device for carrying a three dimensional measuring process according to the present invention may be constructed as shown in FIG. 3, in which reference numeral 1 denotes a video camera; 11, an analog-digital converter; 12, an ordinary illumination source, such as an ordinary light bulb, for irradiating the object 4; and 13 and 14, light sources each comprising a multislit light source 5 and a standard slit light source 6, which can be selectively used in accordance with the orientation of the object 4 (i.e., of FIG. 1). Reference numeral 15 denotes an image processor, which comprises a convolution filter 16 for exhancing the configuration of the object 4, a ridge extractor 17 for extracting the center line of the linear object 4 within one picture element width, a peak extractor 18 for extracting local maxima, a binary extractor 19 for making the binary image, and an AND operator 20 having a function of performing an AND operation between the images. Reference numerals 21 and 22 denote image memories for storing the images taken on the image face C of the camera 1; 23, a direction computer for computing the orientation of the linear object, on the basis of the position of the object 4, whether select either of two light sources 13 and 14 arranged differently to each other; 24, a computer for specifying one of the slit light images of the multislit lights 3 which corresponds to the standard slit light image of the standard slit light 8 (FIG. 1) and for performing computations to determine the correspondence between the slit light image and slit light face M; 25, a computer for computing the three dimensional coordinate using the representations (11) and (12); 26 and 27, buffers; and 29, a CPU (central processing unit) for conducting various controls and computations.

MEASURING PROCESS

It is presumed that an object to be measured is linear like a wire. First, as seen in FIG.1, the multislit light source 5 and the standard slit light source 6 are fixedly arranged near to the linear object 4. The multislit light source 5 and the standard slit light source 6 irradiate the multislit lights 3 and the standard slit light 8, respectively, as described above, and correspond to one set selected from the two sets of light sources 13 and 14 in FIG. 3.

Figure 4A:
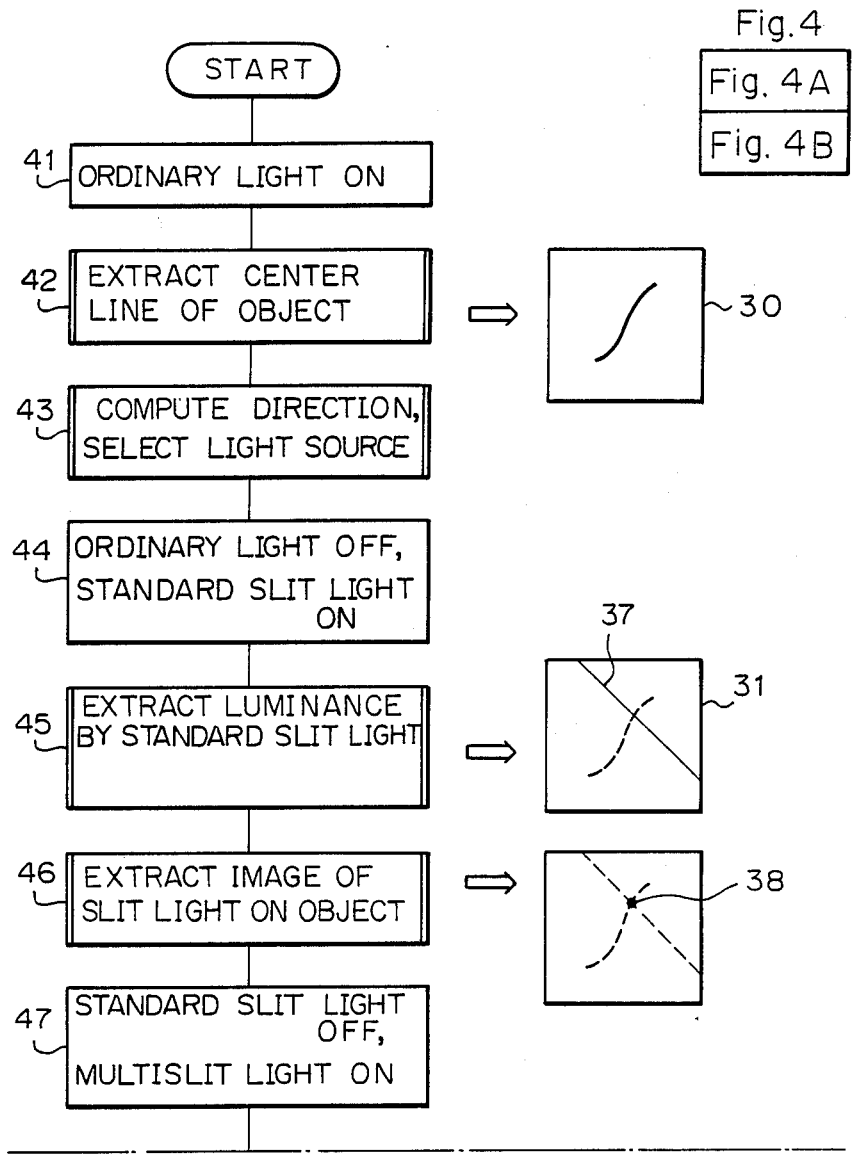
FIG. 4 is a flow diagram illustrating a process for measuring a three-dimensional position in the first embodiment.
Figure 4B:
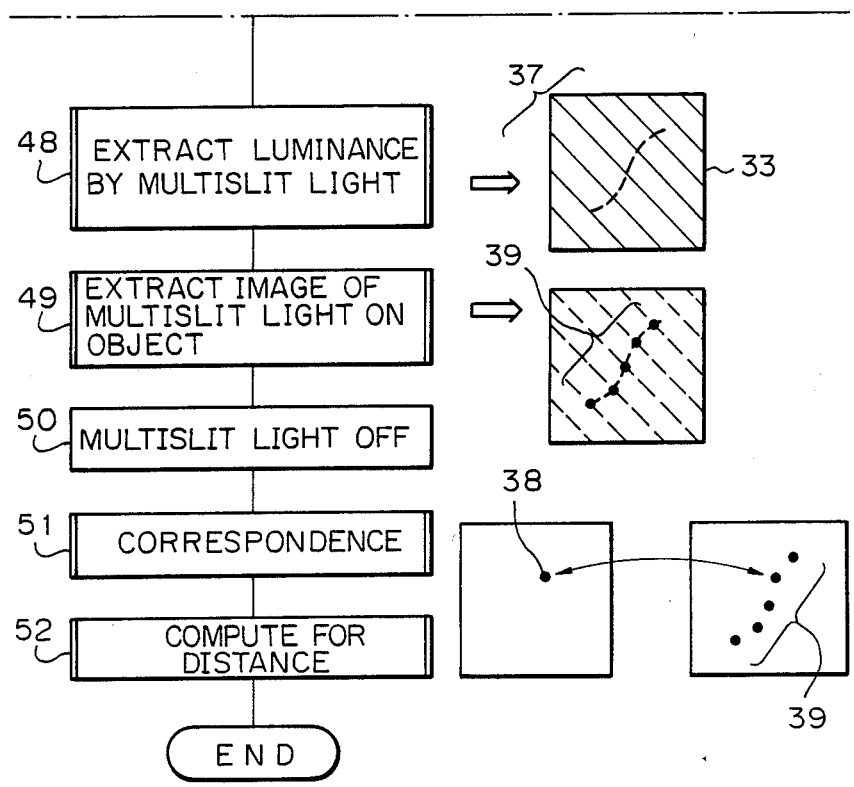

In a flowchart shown in FIGS. 4A and 4B, the ordinary illumination source 12 arranged near to the object 4 is first turned ON to illuminate the object 4 (step 41). However, if the object 4 can be clearly distinguished from the background, such ordinary illumination is not necessary. Next, the object 4 (as optically illuminated by the ordinary illumination source 12) is pictured by the video camera 1 and the configuration of the object 4 is produced or pictured on the image face C, (FIG. 2A) such as a picture element. Then, the pictured image is converted to a digital signal having gray levels (80) (FIG. 5) and input to the image processor 15.

Figure 5:
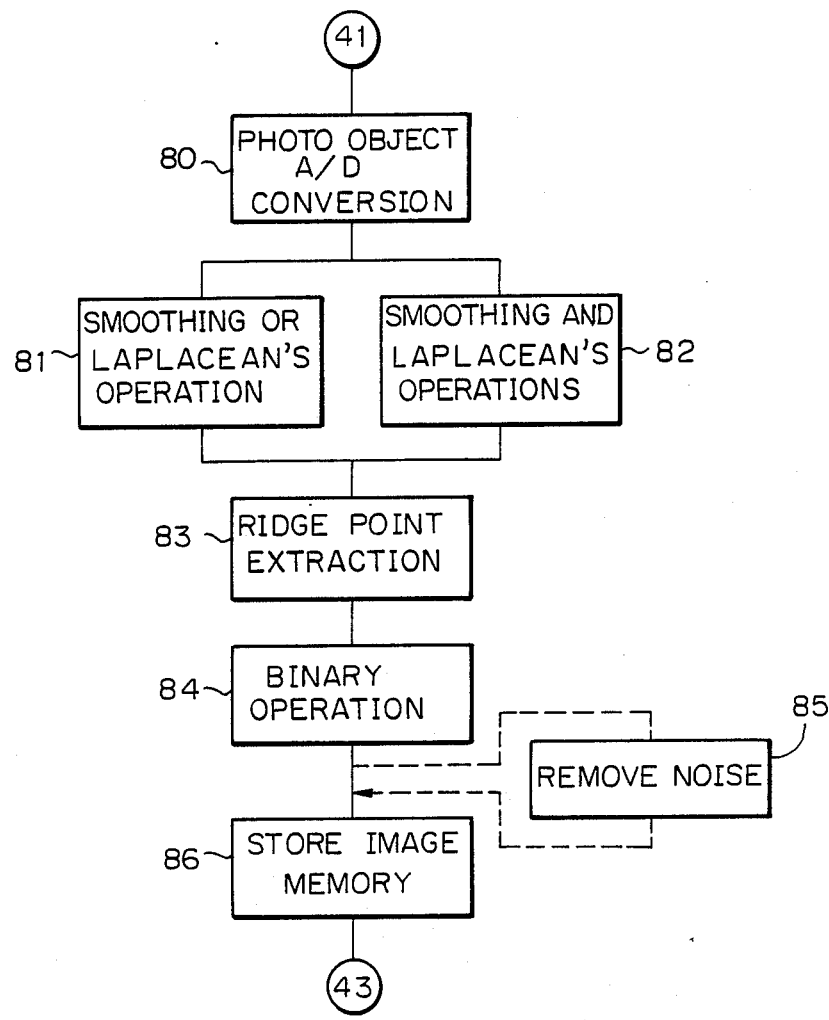
FIG. 5 is a flow diagram illustrating a process for extracting the image of the object.

At the convolution filter 16, a smoothing or Laplacean's operation 81, or both the smoothing and Laplacean's operations is/are performed, as shown in FIG. 5. Next, the comparison between the level of a center pixel and the level of its neighboring pixels is performed at the ridge extractor 17. Then, ridge points in the horizontal or the vertical direction are extracted 83. After a binary operation 84, the center line of the object 4 can be extracted as a line of one pixel width. If a lot of whisker-like noise exists, the digital signal may be subjected to a noise removing process 85, after the binary operation 84.

The center line of the object 4 is stored 86 in the image memory 21 as an image 30 (42). Then, the orientation of the linear object 4 is computed by the computer 23 on the basis of the data obtained, as follows. First, an initial point Ls ($X_s^C$, $Y_s^C$) and a final point Le ($X_e^C$, $Y_e^C$) of the object 4 on the image face C are specified relative to the camera orthogonal coordinate. Here, since the object 4 is a simple elongated linear member, an angle $\phi$ indicating the orientation of the object 4 can be determined from $L_s$ and $L_e$.

Namely, $$0 = \arctan \frac{y_e^C - y_s^C}{x_e^C - x_s^C}$$

Thus, a vector of direction indicating the orientation of the object 4 is as follows.

$$\vec{I} = (\cos \phi, \sin \phi)$$

Using this vector $\vec{I}$, either of the light sources 13 and 14 (designated for convenience of expression hereafter as (A and B), which are arranged in opposite directions, is selected as follows. If it is presumed that the vectors of the light sources 13 and 14 normal to the slit face are $\vec{S}_A$ and $\vec{S}_B$, respectively, the absolute values of products $\vec{I} \cdot \vec{S}_A$ and $\vec{I} \cdot \vec{S}_B$ are computed and both values are compared to select the light source having an absolute value smaller than the other light source (43 in FIG. 4A). This is because more slit light projected images 9 should be collected with respect to the multislit lights (3) in order to improve the resolution of the measurement. However, both the light sources 13 and 14 may be used, to enable two measurements to be derived from their respective, different directions.

Then, the ordinary illumination 12 is turned OFF, but the standard slit light source of the selected light source set 13 or 14 is turned ON to irradiate the standard slit light 8 onto the surface of the object 4 (44 in FIG. 4A). Here, the slit light face S formed by the standard slit light 8 should be previously made to correspond to one of the multislit light(s) 3. A luminance line 7 is provided to cross the object 4 by the standard slit light 8 and a slit projected image 9 is formed on the object 4. The luminance line 7 including the slit projected image 9 is pictured by the camera 1, so that a line image 37 (FIG. 4A) including the standard slit light photo image 38 (FIG. 4A) corresponding to the slit projected image 9 of the standard slit light 8 is obtained on the picture element C of the camera 1. The line image 37 is converted by the analog digital converter 11 shown in FIG. 3 to a digital signal having gray levels (90) and input to the image processor 15.

Figure 6:
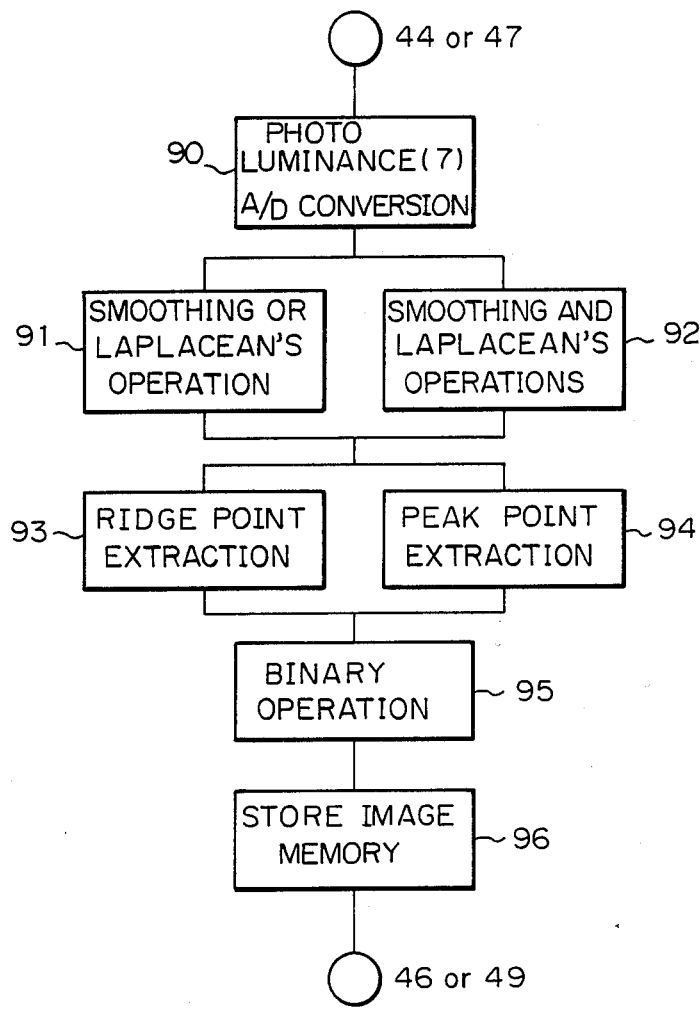
FIG. 6 is a flow diagram illustrating a process for extracting the linear images by a standard slit light and multislit lights.

At the convolution filter 16, a smoothing or Laplacean's operation 91, or both the smoothing and Laplacean's operations is/are performed, as seen in FIG. 6. Next, the comparison between the level of a center pixel and the level of its neighboring pixels is performed. Then, ridge points in the horizontal or the vertical direction can be extracted (93). After a binary operation (94), a luminace line by the standard slit light 37 can be extracted and stored as a picture image 31 (FIG. 4A) in the image memory 22 of FIG. 3 (45 (FIG. 4A)). Here, a peak point (local maxima) extraction 94 (FIG. 6) may be carried at the peak extractor 18 (FIG. 3) in place of the ridge point extraction 93 (FIG. 6) at the ridge extractor 17 (FIG. 3). In this case, a local peak is plotted rather than the luminance line 37 produced by the standard slit light 8. Especially, where the standard slit light picture image 38 is taken as one pixel, the process shown in FIG. 6 is unnecessary.

Figure 7:
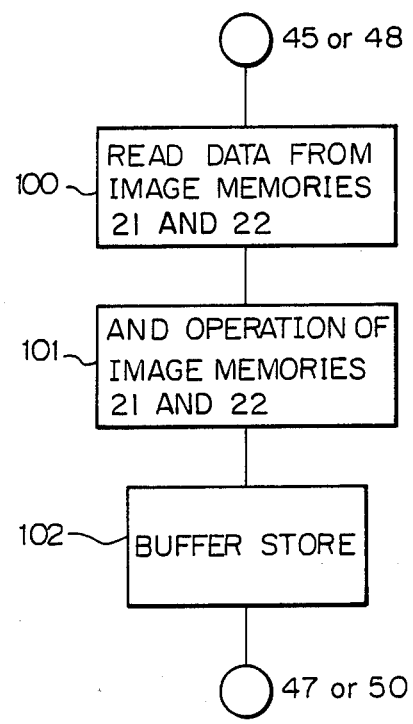
FIG. 7 is a flow diagram illustrating a process for extracting the photo images of the standard slit light and multislit lights.

Then, image data are simultaneously read out from the image memories 21 and 22 and AND operations of the picture images 30 and 31 are carried out by the AND operation 20 (FIG. 3) to obtain the standard slit photo image 38. The standard slit photo image 38 may generally comprise a number of gathered-spots, even if the object is linear. Thus, each coordinate thereof is represented relative to the camera orthogonal coordinate, as $$B_j(x^C, y^C), j=1 \text{ to n}$$

and stored in the buffer 26 (FIG. 3) (46; FIG. 4A). The flow of the process as mentioned above as shown in FIG. 7, from 100 to 102.

Then, the standard slit light source 6 is turned OFF, and the multislit light source 5 is turned ON (47). Taking the slit light photo image 39 by the multislit light(s) 3 is carried out in the same manner as the process of taking the standard slit light photo image 38 by the standard slit light 8. A flow of this process is illustrated in FIG. 4, from 47 to 50, which substantially corresponds to 44 to to 46 in the case of a standard slit light 8. That is to say, a plurality of luminance lines 7 are provided to cross the object 4 by the multislit light(s) 3 and a plurality of slit projected images 9 are formed on the object 4. The luminance lines 7 including the slit projected images 9 are pictured by the camera 1, so that a plurality of line images 37 including a plurality of slit light photo images 39 corresponding to the projected image 9 of the multislit light(s) 3 are obtained on the picture element C of the camera 1. The line images 37 are processed in the same manner as the standard slit light 8 so as to plot the center lines of the line images 37 of the multislit light(s) 3 and store them 96 on the image memory 22 as images 33 (48).

Then, image data are simultaneously read out from the image memories 21 and 22 and AND operations of the picture images 30 and 33 are carried out at the AND operation processor 20 to plot a plurality of slit light photo images 39 (FIG. 4B). Each slit photo image 39 may generally have a number of gathered spots, even if the object 4 is linear. Thus, each coordinate of the slit photo images 39 is represented by the camera orthogonal coordinate, as $$C_k(x^C, y^C), k=1 \text{ to k}$$

and stored in the buffer 27 (49). The other processes which have been carried out in the case of the standard slit light 8 are also carried out in these processes for multislit light(s) 3. Then, the multislit light source 5 is turned OFF (50).

Figure 8:
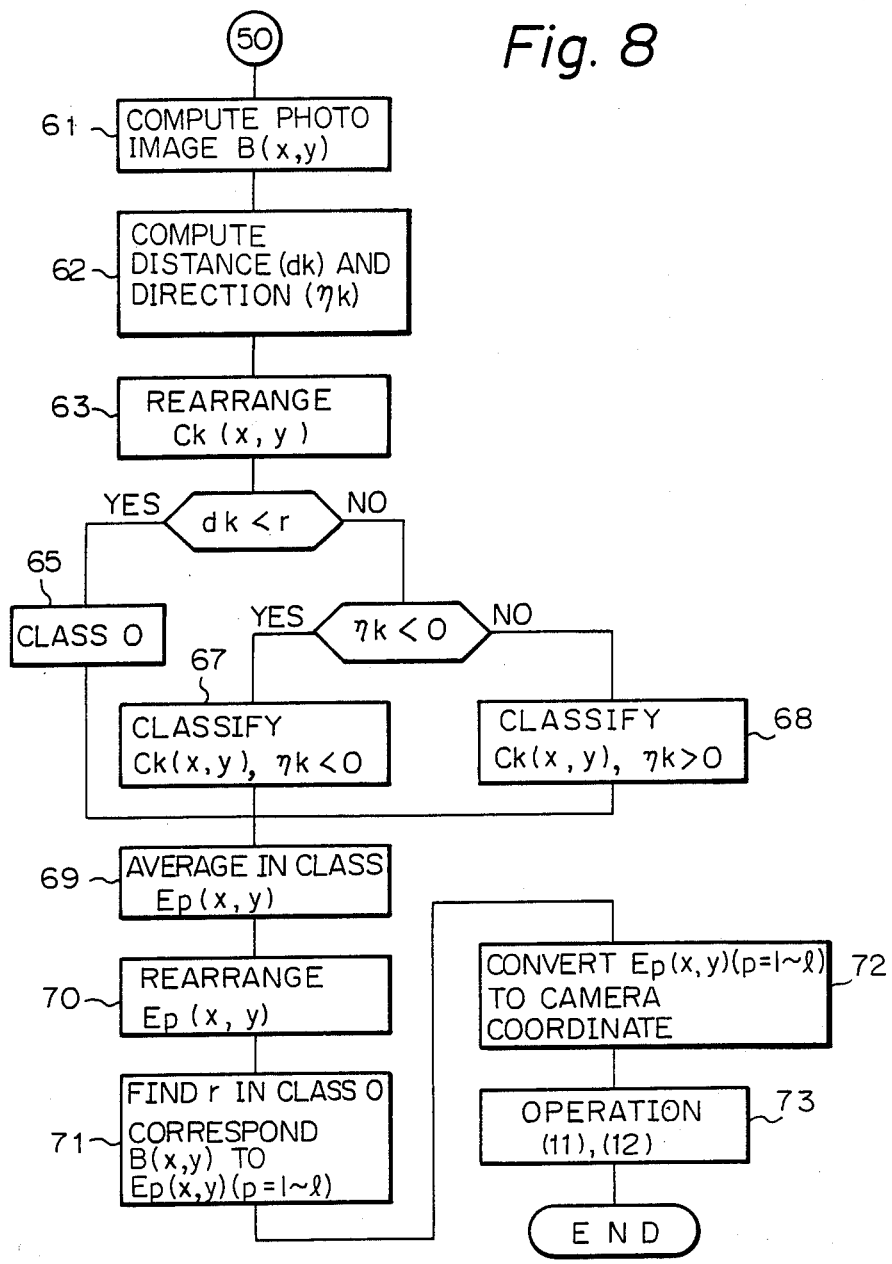
FIG. 8 is a flow diagram illustrating a computing process for obtaining a correspondence.

Then, assuming that there is no interchange between the multislit light photo images 39, the slit light photo image 39 which corresponds to the standard slit light photo image 38 produced by the standard slit light 8 is selected from among the plurality of slit light photo images 39 produced by the multislit light(s) 3. To do this, in the computer 24, a process for determining the correspondence is carried out, as shown in FIG. 8.

First, an average value B (x,y) of the data $B_j$ ($x^C$, $y^C$), j=1 to n, for indicating coordinate positions of the standard slit light photo image 38 is determined to represent the coordinate of the standard slit light photo images 38 (61). That is to say, $$B(x^C, y^C) = \frac{1}{n} \sum_{j=1}^{n} B_j(x^C, y^C)$$

Then, the distance and direction of the standard slit light photo image 38 to each slit light photo image 39 produced by the multislit light(s) 3 are determined (62). Namely, the distance $d_k$ and angle $\eta_k$ on the image face C are represented, respectively, as follows.

$$d_k = |C_k(x^C, y^C) - B(x^C, y^C)|$$

$$\eta_k = \arctan \frac{C_k(x^C) - B(x^C)}{C_k(y^C) - B(y^C)}$$

$$k = 1 \text{ to } k$$

Then, $C_k$ ($x^C$, $y^C$) is rearranged in order from a smaller $d_k$ (63). If $d_k$ is smaller than a distance r, it should be classified into class 0 (65). Then, $\eta_k$ are classified in order of the value nearest to B ($x^C$, $y^C$) into classes 1, 2, 3, ... (68). Similarly, $\eta_k$ of negative value are classified in order of the value near to B ($x^C$, $y^C$) into classes −1, −2, −3, .... If the ridge extractor has been carried out, the average values in the respective classes should be represented, since the slit light photo images 39 might be extracted in a unit of several pixels (69). These are represented as follows.

$$E_p(x^C, y^C), p=1 \text{ to } l$$

If the peak extraction is carried out to extract each slit light photo image within one pixel, the average value is no longer necessary. $E_p$ ($x^C$, $y^C$) are rearranged in order from smaller class (70). If p=r falls in class 0, $E_r$($x^C$, $y^C$) corresponds to the standard slit light photo image 38, and as a result, an image which corresponds to the standard slit photo image 38 is specified among the slit light photo images 39. Therefore, the angle $\theta_S$ of irradiation of the slit light face S by the standard slit light 8 corresponds to number K slit light face $M_k$, so that $E_r$ ($x^C$, $y^C$) is made to correspond to $\theta_k$.

Therefore, assuming that there are no interchanges for the other slit light photo images 39, $E_{r+1}$ ($x^C$, $y^C$) is made to correspond to $\theta_{k+1}$, $E_{r+2}$ ($x^C$, $y^C$) to $\theta_{-k+2}$, ... and, $E_1$ ($x^C$, $y^C$) to $\theta_{k+1-r}$, and also $E_{r-1}$ ($x^C$, $y^C$) to $\theta_{k-1}$, $E_{r-2}$($x^C$, $y^C$) to $\theta_{k-2}$, ... and $E_1$ ($x^C$, $y^C$) to $\theta_{k-r+1}$, respectively (71).

In the above description, although the coordinate of picture image face C is represented by the camera orthogonal coordinate for the sake of simplicity, a picture image coordinate generally can be set on the picture image face C to present it in this coordinate. In this case, however, a process is necessary for changing the picture image coordinate to the camera orthotomic coordinate (72). Thus, each slit light photo image 39 and each slit light face $M_j$ of the multi slit light(s) 3 are made to correspond to each other, on the basis of the relative positions between the specified slit light photo image 39 and the other slit light photo images 39 (51). The coordinate and angle of the slit light photo image 39 on the picture image face C thus obtained are inserted in the above-mentioned representations (11) and (12), ($x^c_{Ii}$, $y^c_{Ii}$, $\theta_i$), i=1−l, and the relationship between the camera orthotomic coordinate and the coordinate of multislit and standard slit, (hij (i, j=1 to 4)) is then determined. Therefore, the distance from the coordinate of the slit light photo image 9 to the coordinate (73, 52), is obtained, and therefore, a three dimensional measurement of the object 4 can be conducted.

In this embodiment, although the object 4 is presumed to be linear, it is not limited to such configurations, but can be applied to a general three dimensional object. In this case, the slit projected image on the object is processed as linear (in this embodiment, processed as spots).

Figure 9:
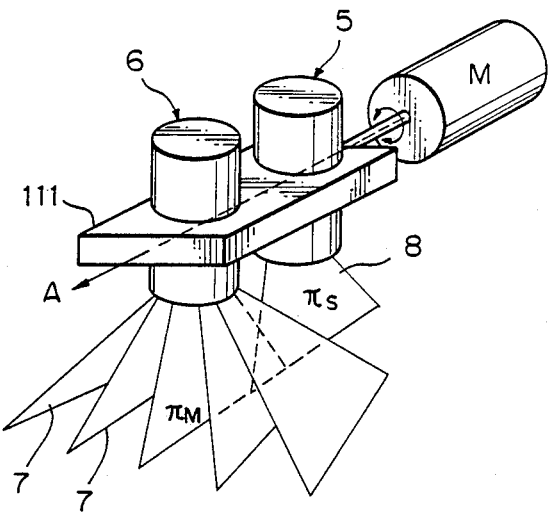
FIGS. 9 and 10 are schematic perspective views illustrating a movable light source assembly.
Figure 10:
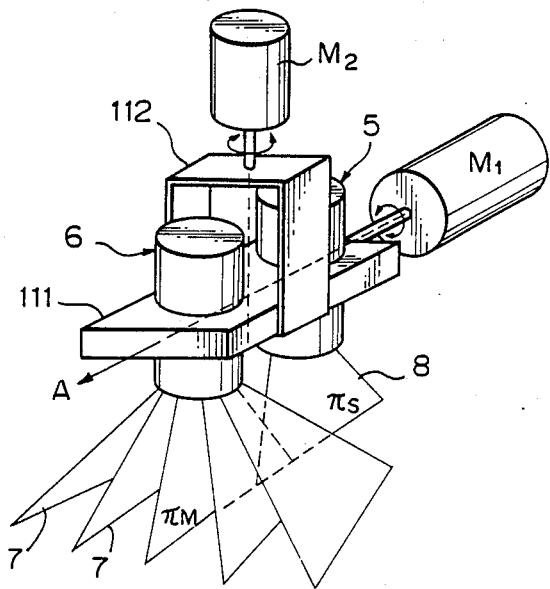

FIGS. 9 and 10 illustrate a light source assembly comprising a base 111 for carrying a single slit light source 5 and a multislit light source 6, which are arranged such that the optical face 8 of the single slit light source 5 corresponds to one of the optical faces of the multislit light source 6. In FIG. 9, the light source assembly (base 111) can be rotated by a motor M about an axis A passing is common through the emitting points of the single slit light and multislit light sources 5 and 6 so as to enable a three dimensional measurement for an object located at any position within the visual field of the camera 1 (FIG. 1). In addition, in FIG. 10, the whole light source assembly comprising a base 111 for carrying a single slit light source 5 and a multislit light source 6, as well as a motor M1, similar to the assembly shown in FIG. 9, is connected to a bracket means 112 connected to another motor M2, such that the base 111 can be rotated about the axis A, by motor M1 and the above mentioned whole light source assembly also can be rotated by motor M2 about an axis B, which intersects perpendicularly the axis A and defines the rotary support shaft of motor M2. Therefore, a three dimensional measurement will be made more widely possible by irradiating from any desired position to an object located at any position within the visual field of the camera.

OTHER EMBODIMENTS

In the above embodiment, although correspondence between the multislit light face and its slit light photo image is carried out by using the standard slit light source and the multislit light source, time-sequential in independent steps it is also possible to provide a shutter in front of a multislit light source so as to perform time division by the shutter, for irradiation by a single standard slit light and a complete multislit light. Alternatively, it is also possible to provide a multislit light source wherein one of the slit light faces has a luminance level higher than the other faces, and thus can be used as the single standard slit light.

Figure 11:
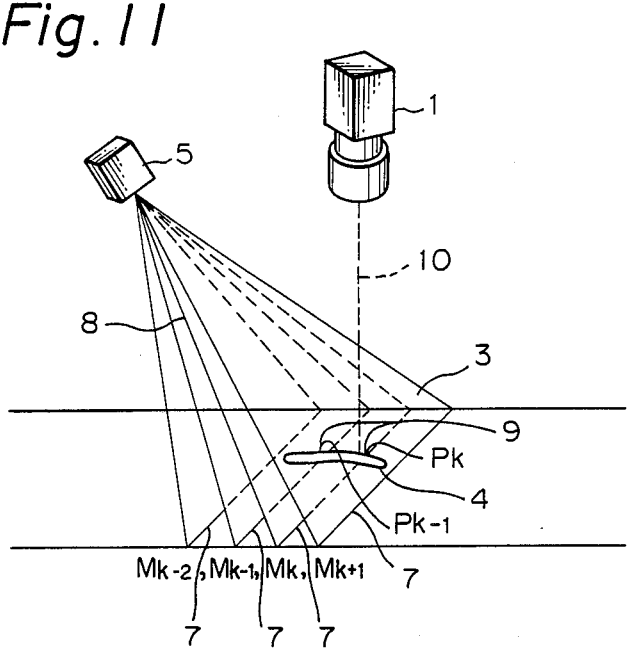
FIGS. 11 and 12 are similar views to FIGS. 1 and 2, respectively, but illustrating a principle of three-dimensional measurement in accordance with second and third embodiments of this invention.
Figure 12:
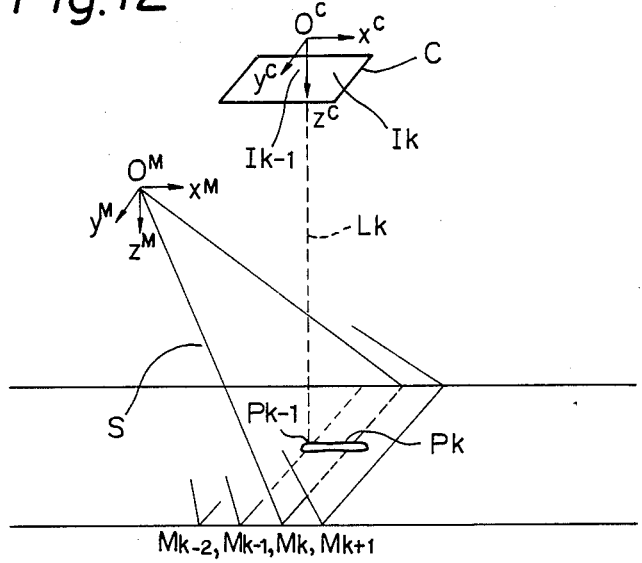

FIGS. 11 and 12 are similar to FIGS. 1 and 2, except that the standard slit light source 5 is omitted. According to these embodiments, and as described in more detail hereafter and with reference to subsequent figures an assembly of a light source (multislit light source) 5 only is necessary, as seen in FIGS. 11 and 12.

SECOND EMBODIMENT

FIG. 13A is a perspective view of a device for emitting multislit light. A parallel light 206 of a single wave length is generated, for instance, by collimating a light beam emitted from a semiconductor laser LD by a collimator lens 207. On an optical axis 208 of the parallel light beam 206, two diffraction gratings A and B having directions of diffraction perpendicular to each other, and a cylindrical lens 209 are arranged. The axis of this cylindrical lens 209 corresponds to the direction of diffraction of grating B of these diffraction gratings. This diffraction grating B has a diffraction grating portion 210, one end of which is positioned on the optical axis 208, as seen in FIG. 13C. Therefore, a part of the incident light is irradiated to the grating portion 210, but the other part thereof is irradiated to the non-grating portion 211. On the other hand, the light is irradiated to the center of the grating portion of the diffraction grating A, and the direction of diffraction thereof is perpendicular to the axis of the cylindrical lens 209, as seen in FIG. 13B.

Since the above two diffraction gratings A and B and the cylindrical lens 209 are arranged as mentioned above, the positions of these elements on the optical axis 208 are not limited. In this particular embodiment, along the parallel incident light beam 206, a diffraction grating A has a direction of diffraction perpendicular to the axis of the cylindrical lens 209.

The parallel light 206 irradiated to the diffraction grating A is a circular optical spot in cross-section, as indicated by S. However, after it has passed through the diffraction grating A and is diffracted, a plurality of optical spots $S_1$, $S_2$, . . . are formed along the diffraction direction, i.e., the y-axis. Then when these spots $S_1$, $S_2$, pass through the diffraction grating B, a row of optical spots $S_1$, $S_2$, . . . are diffracted in the x-axis direction. Therefore, on each of $X_1$, $X_2$, $X_3$, . . . , a plurality of optical spots $S_1$, $S_2$, . . . are formed to make a matrix of optical spots. However, when passed through the diffraction grating B, a part of incident optical spots $S_1$, $S_2$, . . . pass the diffraction grating portion 210, but the other portion thereof passes directly through the non-grating portion 211. Therefore, the luminance of the row of optical spots $S_1$, $S_2$ . . . along the y-axis at the center position $x_3$ is intensified in comparison to the other rows of spots, due to the sum of the diffracted light and directly passed light. Then, when passed through the cylindrical lens 209, each optical spot is enlarged in the direction perpendicular to the axis of this cylindrical lens 209, i.e., in the direction of axis y, and becomes ellipsoidal in cross-section. A part of each ellipse overlaps the adjacent one, so that slit lights $l_1$, $l_2$, $l_3$, . . . are formed. Since the luminance of the slit light $l_3$ on the optical axis 208 is stronger than those of the other slit lights, the slit light $l_3$ can be used as a standard slit light.

Figure 14:
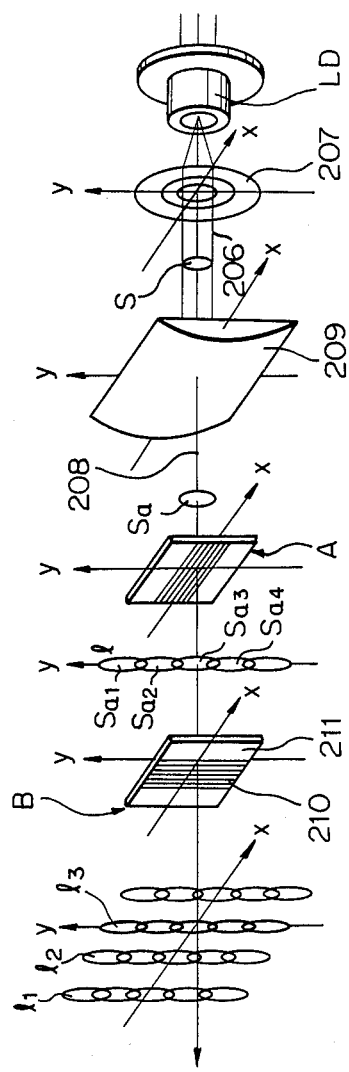
FIG. 14 is a view similar to FIG. 13A, but illustrating another device for emitting multislit lights.

FIG. 14 illustrates an embodiment similar to FIG. 13A. In this embodiment, on an optical axis 208, there are arranged, in turn, a semiconductor laser LD for emitting a laser beam having a single wave length, a collimator lens 207, a cylindrical lens 209, a diffraction grating A having a diffraction direction perpendicular to the axis of the cylindrical lens 209, and a diffraction grating B having a diffraction direction perpendicular to that of the diffraction grating A.

Therefore, the light emitted from the semiconductor laser LD is collimated to a parallel light by the collimator lens 207 and passed through the cylindrical lens 209, so that it is enlarged in the y-direction to become an elliposoidal optical spot Sa. When passed through the diffraction grating A and diffracted in the Y-direction, a plurality of ellipsoidal optical spots Sa1, Sa2, . . . are formed in the y-direction. Each of these optical spots overlaps the adjacent one to form a single slit light 1. The diffraction grating B having a diffraction direction parallel to the axis of the cylindrical lens 209 has a diffracting grating portion 210, one end of which is positioned on the optical axis 208. Therefore, only about a half of the incident slit light passes through the diffracting grating portion 210, and the other half thereof passes directly therethrough without diffraction. Therefore, after having passed the diffraction grating B, the slit light $l_3$ on the optical axis 208 is formed of the sum of the diffracted slit light and non-diffracted slit light, and the other slit lights are formed only of the diffracted slit light. The luminance of the slit light $l_3$ is, therefore, much higher than that of the others.

In the embodiment of FIG. 14, from the side of the collimator lens 207, there are arranged, in turn, the cylindrical lens 209, the diffraction grating A having a diffraction direction perpendicular to the axis of the cylindrical lens 209, and the diffraction grating B having a diffraction direction parallel to the axis of the cylindrical lens 209. These elements may be, however, arranged as desired. It is sufficient to arrange the diffraction grating A having a diffraction direction perpendicular to the axis of the cylindrical lens 209, such that the end of the diffracting grating portion 210 is positioned on optical axis 208. For instance, as seen in FIG. 13A, the cylindrical lens 209 may be arranged behind the gratings A and B. However, these two gratings should be arranged near to each other, because, if the distance between the two is too long, the upper and lower ends of the slit light might be cut off, depending on the size of the cylindrical lens 209.

A multislit slit light source as mentioned above can be used as a light source 5 in FIGS. 11 and 12. In this case, if an exposure aperture of the video camera 1 is narrowed (high level threshold), only one $l_3$ of the slit light(s) which is particularly brighter than all the others can be received by the camera. Therefore, this slit light $l_3$ can be used as a standard slit light. On the other hand, if an exposure aperture of the video camera 1 is enlarged (low level threshold), all the slit light(s) can be received by the camera. Therefore, these slit light(s) can be used as multislit light(s).

Figure 15:
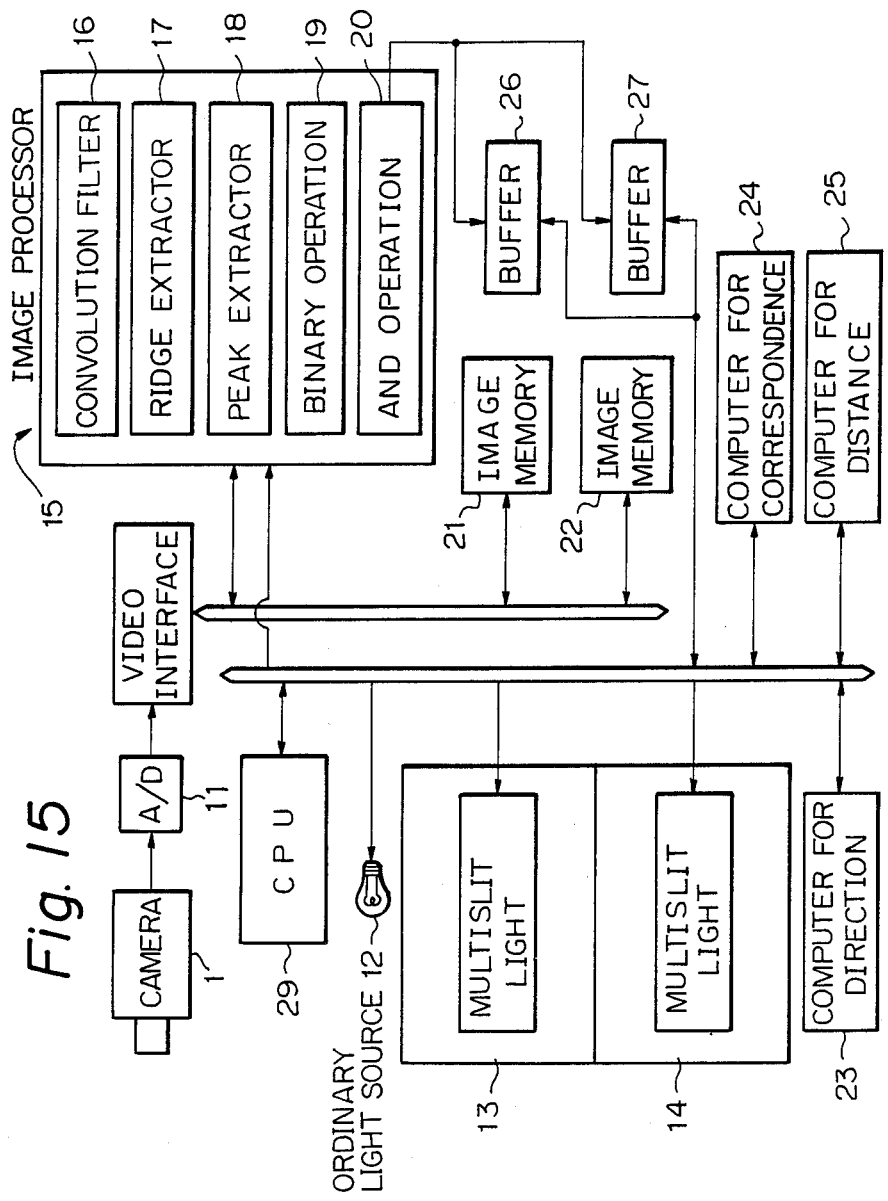
FIG. 15 is a view similar to FIG. 3, but illustrating an apparatus for measuring a three-dimensional position in the second embodiment.

FIGS. 15 and 16 are similar to FIGS. 3 and 4, respectively, but illustrate a three dimensional measuring device and a process thereof for measuring in the second embodiment employing a multislit light source as shown in FIGS. 13A and 14. Therefore, in FIG. 15, each set of light sources 13 or 14 includes only a multislit light source.

Figure 16A:
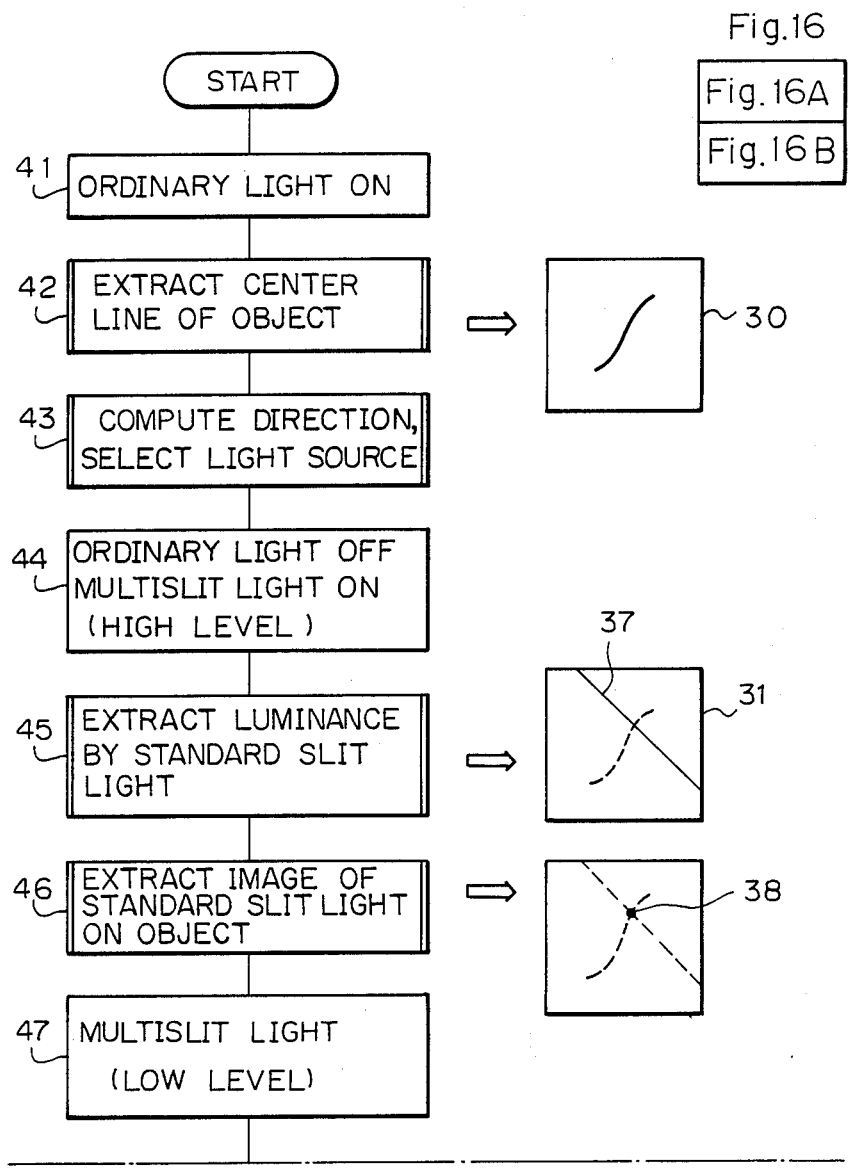
FIG. 16 is a view similar to FIG. 4, but illustrating a process for measuring a three-dimensional position in the second embodiment.
Figure 16B:
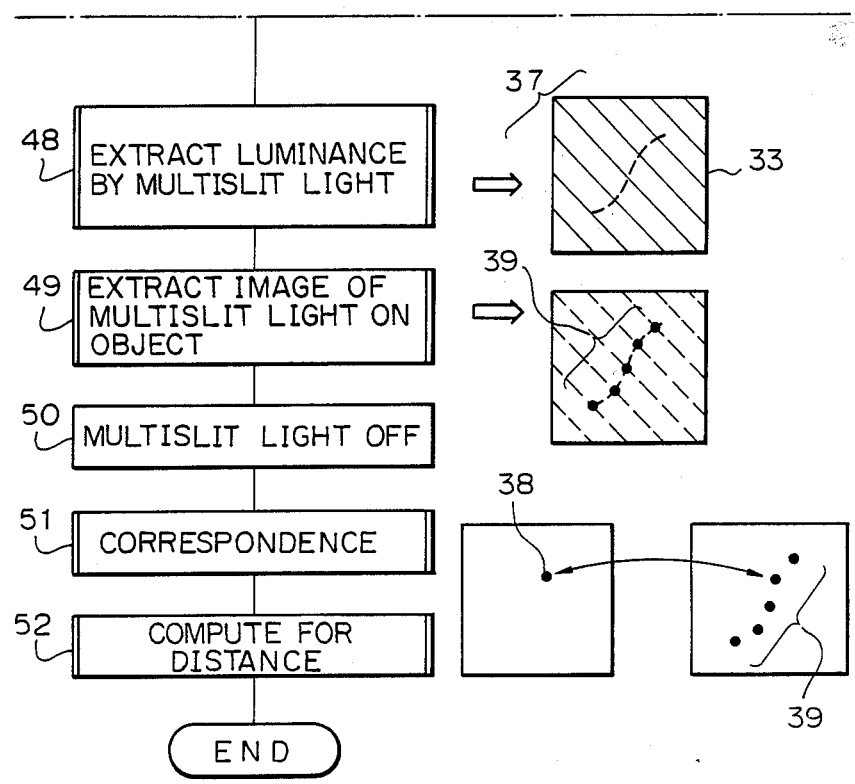

In FIG. 16, (as FIGS. 16A and 16B are collectively referred to in the following) at step 44, the ordinary light is turned OFF and simultaneously, the multislit light source 5 (FIG. 11) is turned ON. In this case, the multislit light projected images 9 (FIG. 11) comprise one particularly bright slit light $l_3$ and the other slit light(s). Therefore, at step 45, the level of threshold in the binary process 95 (FIG. 6) must be high enough to extract only the particularly bright or high intensive slit light (standard slit light) to obtain a standard slit light photo image 38. On the other hand, at step 47, the level of threshold in the binary process 95 (FIG. 6) must be reduced to a low level so as to extract multislit light photo images 39. This process is the same as the previous process for obtaining the standard slit light photo image 38, except that the level of threshold is low.

In the second embodiment, the multislit light source 5 (FIG. 11) may be moveable, in the same manner as mentioned in FIGS. 9 and 10, to enable a three dimensional measurement for an object located at any position within the visual field of the camera 1 (FIG. 11). For this purpose, the multislit light source 5 may be mounted, for example, on an X-Y stage or an industrial robot.

THIRD EMBODIMENT

Figure 17A:
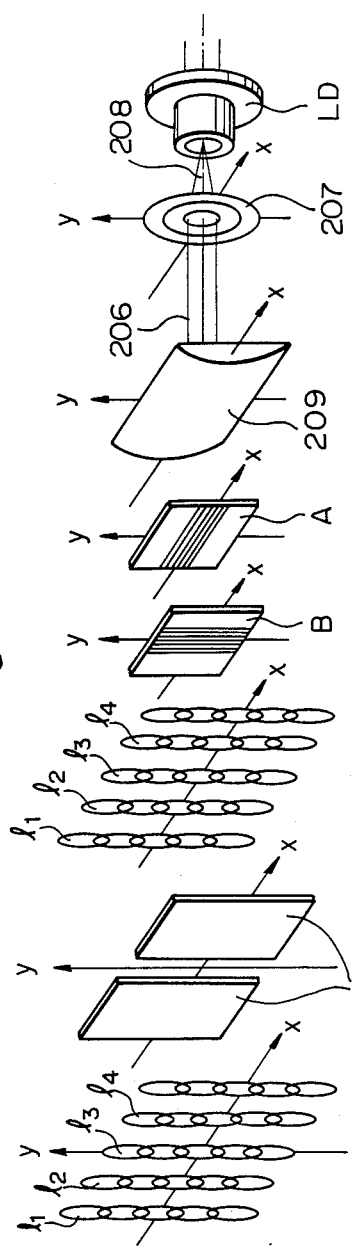
FIGS. 17A and 17B are exploded perspective views illustrating a device for emitting multislit lights in the third embodiment.
Figure 17B:
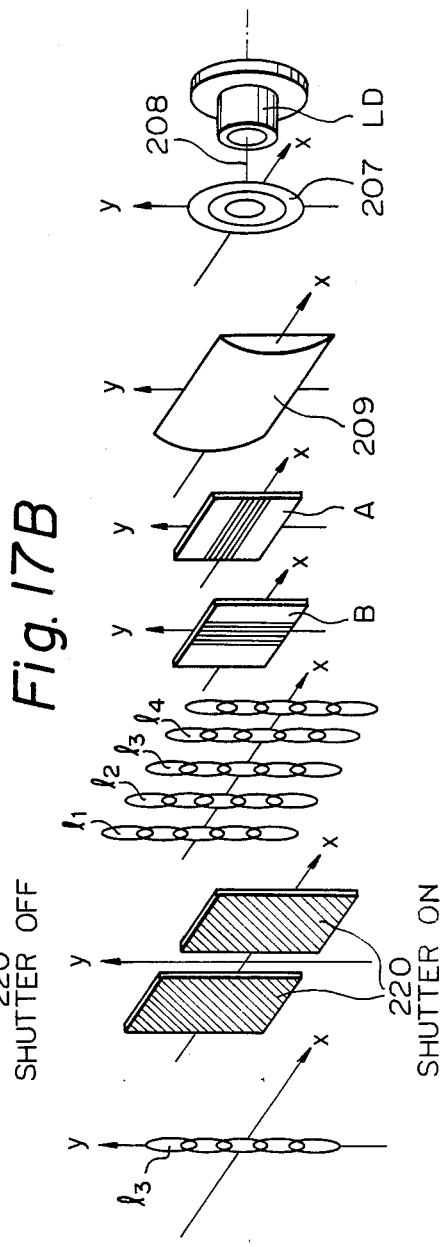

FIGS. 17A and 17B illustrate another embodiment of a device for emitting multislit light, in which FIG. 17A shows the state where the shutter is OFF and FIG. 17B shows the state where the shutter is ON. On an optical axis 208 of the parallel light 106, two diffraction gratings A and B having directions of diffraction perpendicular to each other, and a cylindrical lens 209, the axis of which is parallel to the direction of diffraction of one B of the gratings, are arranged, such that a plurality of slit light(s) $l_1, l_2, \ldots$ are generated after passing through these elements. On the optical axis 208, there are also arranged a semiconductor laser LD for generating a single wave length laser beam and a collimator lens 207.

The light emitted from the semiconductor laser LD passes through the collimator lens 207 to become a parallel light, and then passes through the cylindrical lens 209 to be enlarged in the direction y to become a light of an ellipsoidal cross-section spot. Then, it passes through the diffraction grating A and is diffracted to become a vertically elongated optical spot, i.e., a slit light, formed along the direction of diffraction, axis y. Then, when it passes through the grating B, the slit light is diffracted in the axis x direction. Therefore, a plurality of slit lights $l_1, l_2, \ldots$, that are multislit light(s) are formed.

In this embodiment, a shutter means 220 is arranged so as to block the slit lights other than a particular light. According to this embodiment, since the shutter 220 is arranged so as to block the slit lights other than a particular slit light, when the shutter 220 is turned ON and closed, only the particular single slit light (standard slit light) $l_3$ is obtained, since the other slit lights are blocked, as illustrated in FIG. 17B. When the shutter 220 is turned OFF and opened, all of the slit lights, namely multislit lights, $l_1, l_2, l_3, \ldots$ are obtained, since the shutter 220 allows all of the slit lights to pass therethrough, as illustrated in FIG. 17A.

Figure 18:
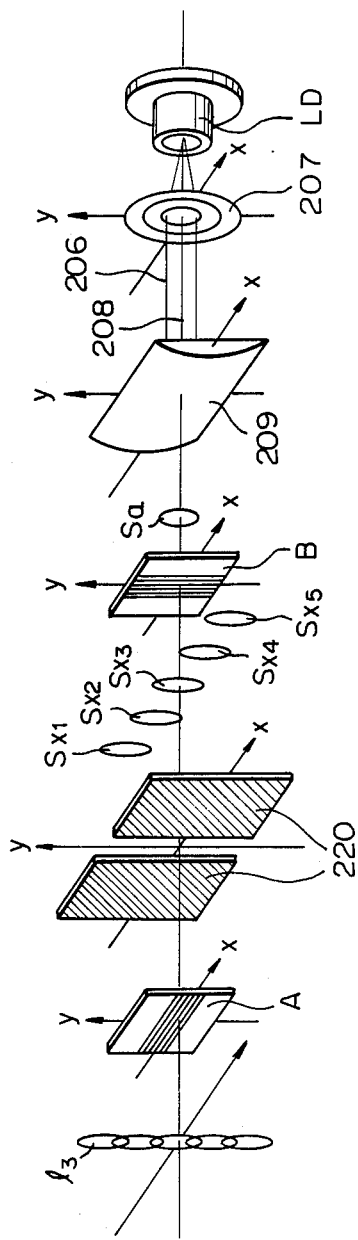
FIG. 18 is a view similar to FIG. 13A, but illustrating another device for emitting multislit lights in the third embodiment.

In FIG. 18, the diffraction gratings A and B are reversed with respect to each other. After passing through the cylindrical lens 209, the light having a cross-section of a vertically elongated ellipsoidal spot passes through the grating B and is diffracted in the axis x direction. Therefore, a plurality of lights sx1, sx2, ... are formed. Since the shutter 220 is arranged between the two gratings A and B, all the lights sx1, sx2, ..., other than a particular light sx3, are blocked when the shutter 220 is turned ON and closed. Then, the light sx3 passes through the diffraction grating A and is diffracted to become a vertically elongated single slit light (a standard slit light) $l_3$. When the shutter 220 is turned OFF and opened, all the spot lights sx1, sx2, ... diffracted in the x direction at the grating B pass to grating A and are diffracted in the y direction to become multislit lights $l_1, l_2, \ldots$.

Figure 19B:
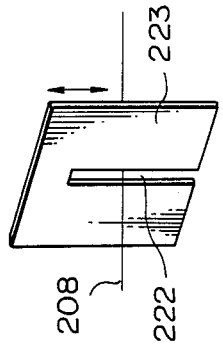
FIGS. 19A and 19B are perspective views of shutter elements used in the multislit light emitting device shown in FIG. 18.
Figure 19A:
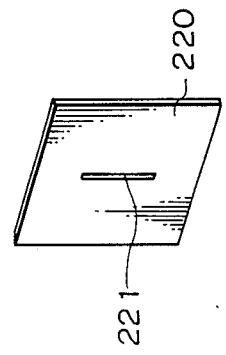

FIGS. 19A and 19B illustrate electronic and mechanical shutter elements, respectively. As an electronical shutter, which has no mechanically moveable members, one using liquid crystal utilizing polarization effects, or one comprising a so-called PLZT disposed between two polarization plates can be used. The PLZT consists of four components, titan, zircon, lead, and lantan and has an effect of changing the polarization face, or plane, depending on whether the electrical power is made ON or OFF. The electronics shutter 220 may be one which has two shutter elements spaced from each other, as seen in FIGS. 17A, 17B and 18, or one 220 which has one shutter element provided with an optical aperture 221 at a position corresponding to the standard slit light, as seen in FIG. 19A. On the other hand, a mechanical shutter may be one which has an optical aperture 222 which allows only the standard slit light to pass therethrough, as seen in FIG. 19B. In order to obtain multislit light(s) $l_1, l_2, \ldots$, the shutter element 223 should be retracted from the optical path. Conversely, in order to obtain a single standard slit light $l_3$, the shutter element 223 should be removed onto the optical path 208 so that only the single standard slit light $l_3$ passes the aperture 222.

Figure 20:
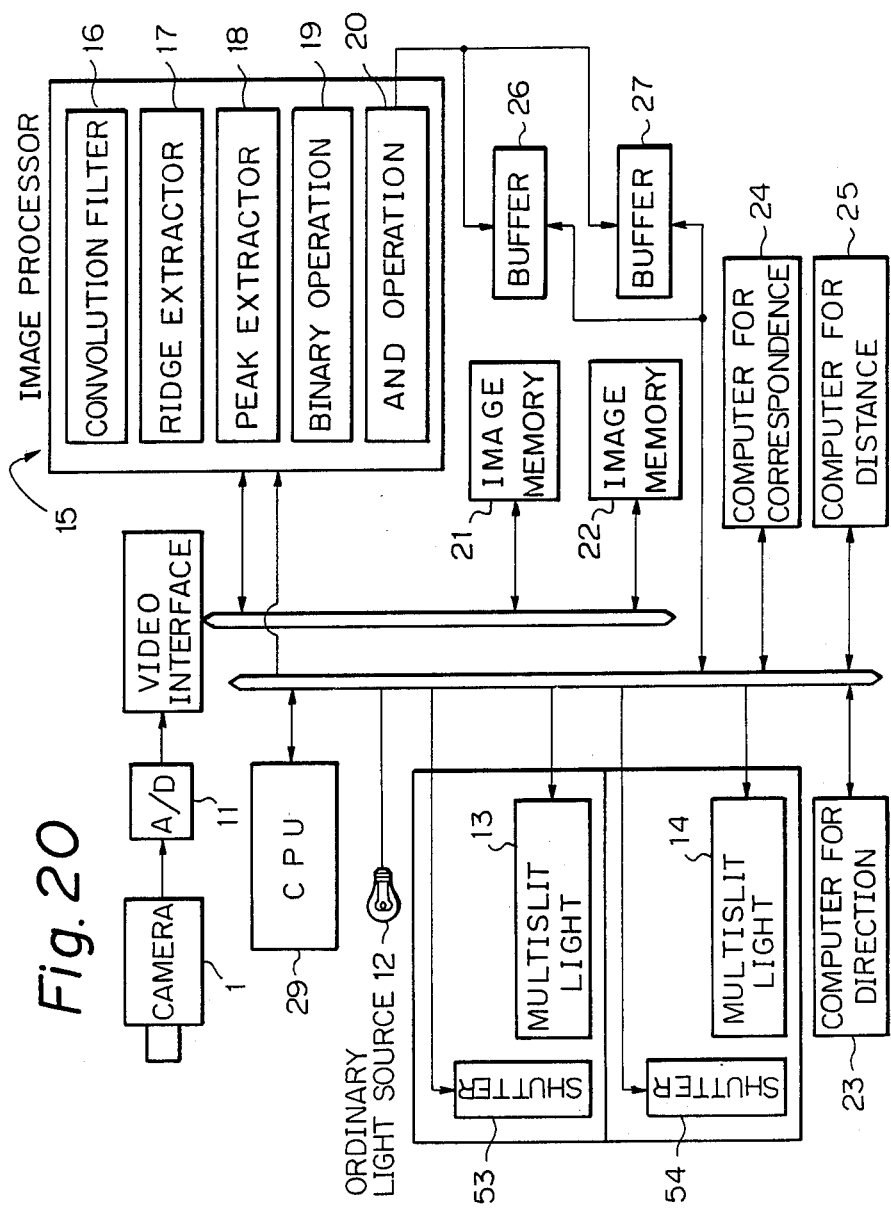
FIG. 20 is a view similar to FIG. 3, but illustrating an apparatus for measuring a three-dimensional position in the third embodiment; and, FIG. 21 is a view similar to FIG. 4, but illustrating a process for measuring a three-dimensional position in the third embodiment.
Figure 21A:
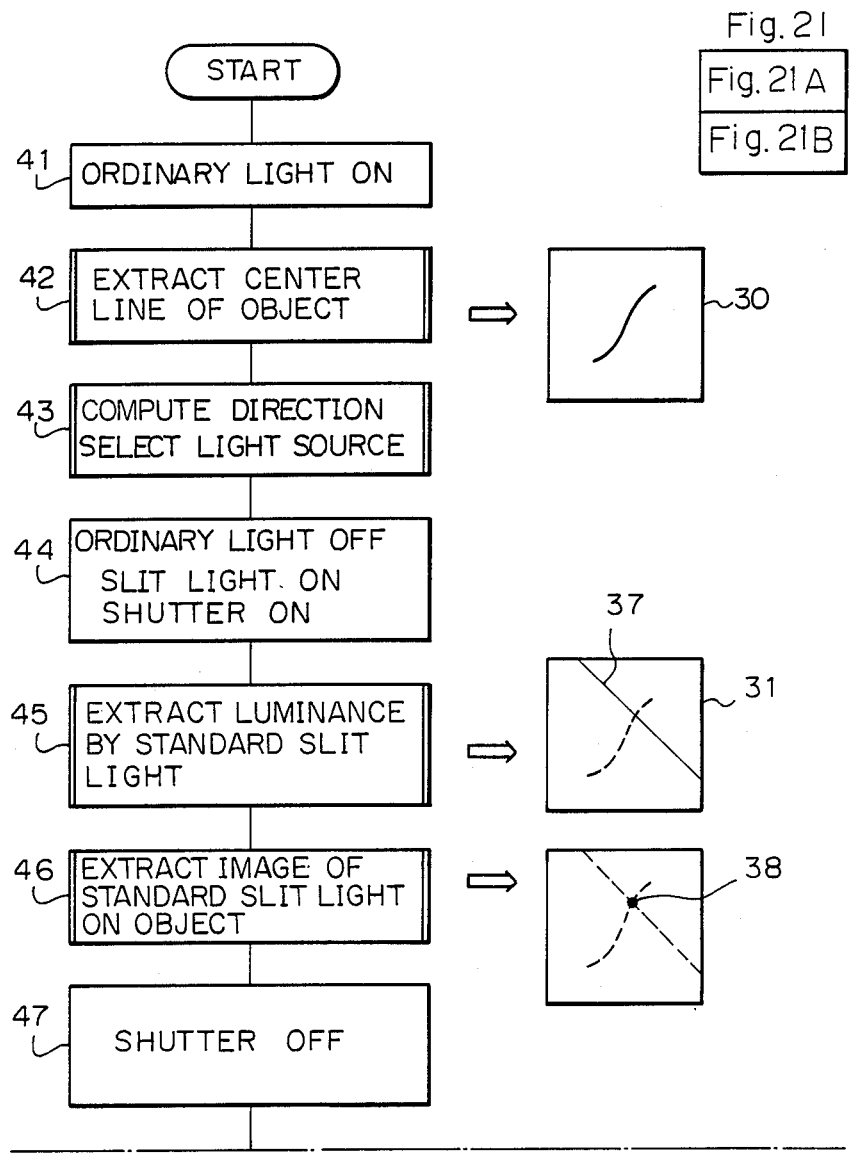
Figure 21B:
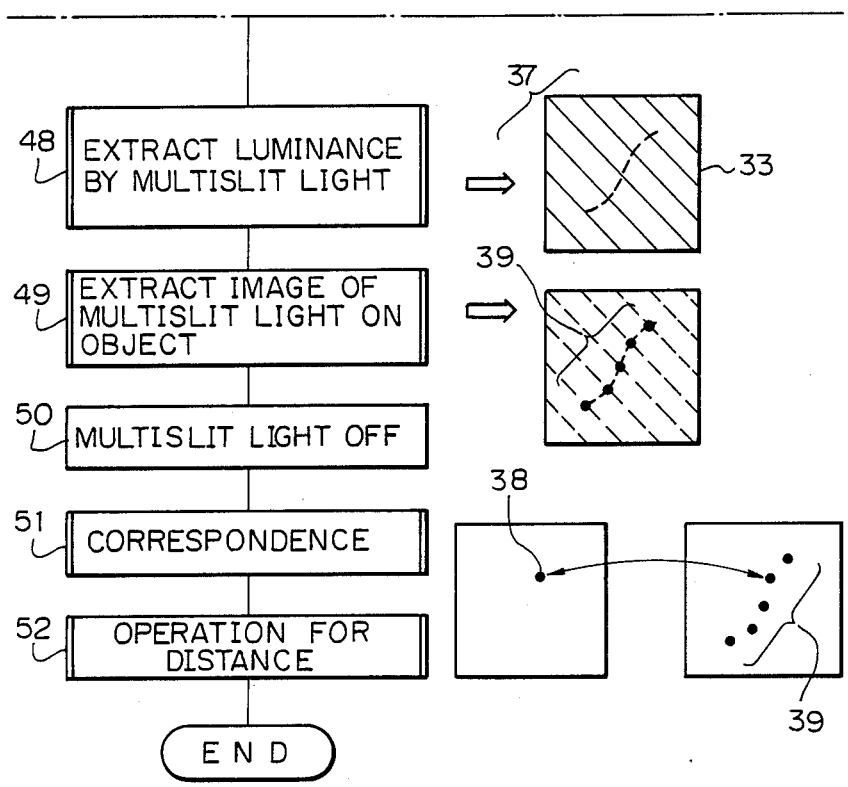

FIGS. 20 and 21 are similar to FIGS. 3 and 4, respectively, but illustrate a three dimensional measuring device and the process thereof for measuring in the third embodiment employing a multislit light source as shown in FIGS. 17 (A, B) and 18. Therefore, in FIG. 20, each set of light source 13 or 14 includes a multislit light source and a shutter 53 or 54. In FIG. 21A, at step 44, the ordinary light is turned OFF and simultaneously, the multislit light source 5 (FIG. 11) is turned ON. In this case, the shutter is closed to obtain a single standard slit light, as mentioned above. On the other hand, at step 47, the shutter is opened to obtain multislit lights, as also mentioned above. The ON and OFF operation of the shutter may be controlled either by a host computer, for instance, or manually.

In the third embodiment, the multislit light source 5 (FIG. 11) may be moveable, or the shutter may be movable, although the light source is fixed, so as to enable three dimensional measurement of an object located at any position within the visual field of the camera 1 (FIG. 11). In addition, the shutter may have a plurality of segments which correspond to the respective slit light(s) of the multislit lights, so that the position of the desired slit light may be changed by controlling the respective shutter segments.

We claim:

1. A method for measuring a three-dimensional position of an object, comprising the steps of:
   irradiating the surface of the object with a multiplanar light beam comprising a plurality of planar light beams which exist in respective planes having a predetermined relative relationship and defining parallel luminance lines in a plane including the surface of the object and corresponding to a predetermined coordinate direction thereby to produce a corresponding plurality of planar light beam projected images of the surface of the object;
   irradiating the surface of the object with a single standard planar light beam which exists in a plane common to one of the planes of the multiplanar light beam and produces a corresponding luminance line on the surface of the object thereby to produce a corresponding, single standard planar light beam projected image of the surface of the object;

obtaining a plurality of planar light beam photo images corresponding to the plurality of planar light beam projected images;

obtaining a single standard planar light beam photo image corresponding to the single standard planar light beam projected image;

identifying a specific one of the plurality of planar light beam photo images which corresponds to the single standard planar light beam photo image;

determining the correspondence between the plural planar light beam photo images and the respective planes of the plural planar light beams of the multiplanar light beam on the basis of the relative positions of the identified, specific planar light beam photo image and the remaining planar light beam photo images of the plurality thereof formed by the multiplanar light beam; and computing the three-dimensional position of the object in the predetermined coordinate on the basis of the relative positions of the respective, plural planar light beam photo images and the respective planes thereof, as determined theretofore to correspond to the respective planar light beam photo images.

2. A method as set forth in claim 1, wherein the object is linear, the coordinates of the standard planar light beam photo image on the object and the plural planar photo images on the object are extracted by AND operations of the center line photo image on the object and the standard planar light beam photo image, and of the center line photo image on the object and the plural planar light beam photo images.

3. A method as recited in claim 2, wherein said identifying a specific one of the plurality of planar light beam photo images which corresponds to the single standard planar light beam photo image, comprises the steps of:
(a) averaging the coordinates of the single standard planar light beam photo image on the object;
(b) determining the distance and direction of the single standard planar light beam photo image on the object to each of the plurality of planar light beam photo images on the object; and
(c) rearranging and classifying the coordinates of the plurality of planar light beam images on the object based upon said determining in step (b).

4. A method as set forth in claim 1, wherein said object is solid, the coordinates of the standard planar light beam photo image on the object and the plural planar light beam photo images on the object are extracted by AND operations of the configuration line photo image on the object and the standard planar light beam photo image, and of the configuration photo image on the object and the plural planar light beam photo images.

5. A method as recited in claim 4, wherein said identifying a specific one of the plurality of planar light beam photo images which corresponds to the single standard planar light beam photo image, comprises the steps of:
(a) averaging the coordinates of the single standard planar light beam photo image on the object;
(b) determining the distance and direction of the single standard planar light beam photo image on the object to each of the plurality of planar light beam photo images on the object; and
(c) rearranging and classifying the coordinates of the plurality of planar light beam images on the object based upon said determining in step (b).

6. A method as recited in claim 1, further comprising:
obtaining the correspondence between the respective planar light beam photo images and the corresponding planes of the planar light beams of the multiplanar light beam for the condition that no interchange has occurred between the plurality of planar light beam photo images.

7. A method as recited in claim 1, further comprising:
irradiating the surface of the object with a multiplanar light beam produced by a multiplanar light source;
arranging a single standard planar light source relative to the multiplanar light source such that the plane of the single standard planar light beam is identical to a selected one of the planes of the planar light beams of the multiplanar light beam; and
irradiating the surface of the object with the single standard planar light beam from the single standard light beam source, as thus arranged relative to the multiplanar light beam source.

8. A method as recited in claim 1, further comprising;
providing a multiplanar light beam source producing a plurality of planar light beams and having a selected planar light beam, out of the plurality thereof, of higher luminance than the remainder of the plurality of the planar light beams; and
performing the step of irradiating the surface of the object with a multiplanar light beam by utilizing the plurality of planar light beams of the source, including the light beam of higher luminance than the remainder thereof; and
performing the step of irradiating the surface of the object with a single standard planar light beam by irradiating the object with the multiplanar light beam source having a planar light beam of higher luminance and utilizing only the planar light beam of higher luminance as the single standard planar light beam.

9. A method as recited in claim 8, further comprising:
performing the step of obtaining a plurality of planar light beam photo images by selective binary processing at a high level thereby to obtain parallel light beam photo images corresponding to all of the plurality of planar light beam projected images; and
performing the step of obtaining a standard planar light beam photo image by low level binary processing thereby to obtain as the standard planar light beam photo image the photo image corresponding to and produced by the high luminance planar light beam.

10. A method as recited in claim 1, further comprising:
providing a source of a multiplanar light beam;
performing the step of irradiating the surface of the object with a multiplanar light beam by utilizing the multiplanar light beam source; and
performing the step of irradiating the surface of the object with a single standard planar light beam by blocking all but a selected one of the planar light beams of the source thereof and irradiating the surface of the object with the selected planar light beam.

11. A method as recited in claim 1, further comprising:
performing the steps of irradiating the surface of the object with a multiplanar light beam and with a single standard planar light beam in individual time periods of selected succession.

12. A method as recited in claim 1, wherein said irradiating the surface of the object with a multiplanar light beam is performed by a single light source having a single light beam.

13. A method as recited in claim 1, wherein said obtaining a plurality of planar light beam photo images is performed by a single camera.

14. A device for emitting multiplanar light beams comprising:
means for generating a single wavelength, parallel light beam defining an optical axis;
first and second diffraction gratings positioned in the path of the parallel light beam with the respective gratings thereof in mutually perpendicular relationship and both transverse to the optical axis, the first grating receiving the parallel light beam and producing a linear array of optical spots parallel to the direction of diffraction of the second diffraction grating;
a cylindrical lens having a longitudinal axis and positioned along the optical axis with the longitudinal axis thereof parallel to the direction of diffraction of one of the diffraction gratings;
the said one of the diffraction gratings having a first, diffraction grating portion and a second, non-grating diffraction portion in contiguous edge-to-edge relationship and positioned on the optical axis such that the optical spots of the diffracted light beam produced by the first diffraction grating are incident in part on the diffraction grating portion and in part on the non-diffraction grating portion of the second diffraction grating, the non-diffraction grating portion transmitting the part of the optical spots of the diffracted beam incident thereon directly therethrough and without diffraction thereof.

15. A device as recited in claim 14, wherein:
the second diffraction grading is positioned with the contiguous edge of the diffraction grating portion thereof on the optical axis thereby to produce plural, parallel planar light beams having a central planar light beam of higher luminance than the remainder thereof for use as a standard single planar light beam.

16. A device as recited in claim 15, wherein:
the second diffraction grating has a direction of diffraction parallel to the longitudinal axis of the cylindrical lens; and
the first and second diffraction gratings and the cylindrical lens are positioned at successive first, second and third positions, respectively, along the optical axis from the generating means.

17. A device as recited in claim 15, wherein:
the second diffraction grating has a direction of diffraction parallel to the longitudinal axis of the cylindrical lens; and
the cylindrical lens and the first and second diffraction gratings are respectively positioned at successive, first, second, and third positions, respectively, along the optical axis from the generating means.

18. A device for emitting multiplanar light beams comprising:
means for generating a single wavelength, parallel light beam defining an optical axis;
first and second diffraction gratings positioned in the path of the parallel light beam with the respective gratings thereof in mutually perpendicular relationship and both transverse to the optical axis;
a cylindrical lens having a longitudinal axis and positioned in the path of the parallel light beam and with the longitudinal axis thereof parallel to the direction of diffraction of one of the diffraction gratings;
the second diffraction grating having a first, grating portion and a second, non-grating portion in contiguous, edge-to-edge relationship and with the contiguous edge of the diffraction grating portion thereof positioned on the optical axis;
the lens and the first and second diffraction gratings being positioned in a selected succession along the optical axis and together forming, from the light beam generated from the generating means, a plurality of parallel light beams; and
a shutter positioned on the optical axis, operable selectively between a partially closed, selective light beam blocking position and an open, light beam transmitting and non-blocking position, the light beam passing through the shutter means in its open position and the device thereby emitting plural parallel planar light beams and the light beam being selectively blocked by the shutter means in its blocking position and the device thereby emitting a single planar light beam for use as a standard single planar light beam.

19. A device as recited in claim 17, wherein:
the second diffraction grating has a direction of diffraction parallel to the longitudinal axis of the cylindrical lens; and
the cylindrical lens is positioned in the path of the light beam in front of the second diffraction grating.

20. A device as recited in claim 19, wherein:
the second diffraction grating has a direction of diffraction parallel to the longitudinal axis of the cylindrical end; and
the cylindrical lens, the first and second diffraction gratings, and the shutter are positioned at successive first, second, third and fourth positions, respectively, along the optical access from the generating means.

21. A device as recited in claim 16, wherein:
the second diffraction grating has a direction of diffraction parallel to the longitudinal axis of the cylindrical lens; and
the cylindrical lens, the second diffraction grating, the shutter, and the first diffraction grating are positioned at successive, first, second, third and fourth positions, respectively, along the optical axis from the generating means.

* * * * *